United States Patent Office 3,070,605
Patented Dec. 25, 1962

3,070,605
PREPARATION OF PARA-DITHIANE
Paul F. Warner, Phillips, Tex., assignor to Phillips Petroleum Company, a corporation of Delaware
No Drawing. Filed Aug. 8, 1960, Ser. No. 47,947
5 Claims. (Cl. 260—327)

This invention relates to a novel method of preparing para-dithiane.

Many methods have been proposed or used in the past for preparing p-dithiane, a chemical compound useful as a pesticide or as a precursor of compounds such as sulfoxides and other compounds valuable as pesticides or for other applications. While some of these prior art methods are satisfactory, many of them require relatively expensive reactants that are not readily commercially available, and others result in poor yields.

I have discovered a novel method of preparing p-dithiane by a relatively simple and inexpensive method, which method results in substantial yields of the desired product. According to this invention, this method of preparing p-dithiane comprises reacting ethylene, hydrogen sulfide, and carbon disulfide in the presence of a cobalt molybdate catalyst, and recovering p-dithiane from the resulting reaction mixture.

The cobalt molybdate useful in the practice of this invention is a known material which has enjoyed widespread use in the petroleum industry in the catalytic conversion and purification of hydrocarbons, particularly in conjunction with a metal oxide or clay support or carrier. As used in this specification and in the appended claims, the term "cobalt molybdate" is meant to cover the oxides of cobalt and molybdenum, either as such or in combined form. Cobalt molybdate is commonly written as $CoMoO_4$ or $CoO.MoO_3$.

Cobalt molybdate can be prepared by prior art methods and it is commercially available from several sources. It can be made by mechanically mixing the active components or from heating decomposable compounds capable of being converted to oxides. While the cobalt molybdate material per se is useful in the practice of this invention, I prefer to use it in conjunction with a support or carrier material, the combination hereinafter occasionally referred to as a supported cobalt molybdate catalyst.

Cobalt compounds useful in preparing the catalyst used in this invention representatively include cobalt sulfate, cobalt nitrate, cobalt carbonate, cobalt oxalate, cobalt formate, cobalt acetate, cobalt chloride, cobalt chlorate, cobalt bromide, cobalt bromate, cobalt fluoride, cobalt fluorate, cobalt iodide, cobalt fluorosilicate, cobalt ammonium nitrate, cobalt ammonium sulfate, cobalt ammonium chloride, and the like, including mixtures thereof.

Molybdenum compounds useful in preparing the catalyst used in this invention representatively include molybdenum trioxide, molybdenum tetrabromide, molybdenum oxydibromide, molybdenum tetrachloride, molybdenum oxydichloride, molybdenum oxypentachloride, molybdenum oxytetrafluoride, ammonium molybdate, ammonium dimolybdate, ammonium heptamolybdate, ammonium paramolybdate, molybdic acid, molybdic anhydride, and the like including mixtures thereof.

The cobalt compound that is preferred in preparing said catalyst is cobaltous nitrate hexahydrate, $$Co(NO_3)_2 \cdot 6H_2O,$$

and the molybdenum compound preferred in preparing said catalyst is ammonium heptamolybdate tetrahydrate, $(NH_4)_6Mo_7O_{24} \cdot 4H_2O$.

The preferred supported cobalt molybdate catalyst can be prepared by a number of prior art methods. It can be formed by co-precipitating compounds of the active metals and the carrier from a single solution in order to form a gel of the carrier having the catalytically active metals uniformly dispersed therein, and then calcining the gel to convert the compounds to the oxides. Or, the supported catalyst can be formed by impregnation techniques where either or both the cobalt and molybdenum components are deposited on the carrier by impregnating the carrier with a solution or solutions of the active components, thereafter calcining the impregnated carrier. Another method for preparing the supported catalyst is simply by mechanically mixing the active components and the carrier and forming the mixture into catalyst pellets.

The supports or carriers which can be used in preparing the supported catalyst representatively include metal oxides such as alumina, silica, titania, zirconia, thoria, magnesia, zinc oxide, and mixtures thereof. Other supports which can be used include such naturally occurring materials like diatomaceous earth, feldspar, bauxite, kaolin, fuller's earth, kieselguhr, montmorillonite, bentonite, Attapulgus clay, and mixtures thereof.

The relative amounts of the cobalt oxide and molybdenum oxide components can vary over a wide range, but generally the weight ratio of cobalt oxide to molybdenum oxide will be in the range between about 1:1 to 1:20. In the case of supported cobalt molybdate catalysts, the support or carrier will comprise the major component (preferably at least 60 wt. percent) and the cobalt molybdate will comprise the minor component. Most applicable will be supported cobalt molybdate catalysts where the cobalt component, calculated as cobaltous oxide, will amount to about 1 to 20 wt. percent and the molybdenum component, calculated as molybdenum trioxide, will amount to about 2 to 25 wt. percent. Commercially available supported catalysts which can be used include cobalt oxide-molybdenum oxide-alumina where the cobalt component amounts to 2 to 3 wt. percent and the molybdenum component amounts to 6 to 8 wt. percent.

The reaction system used is continuous where the reactants are fed in equi-molecular amounts, singly or preferably as a combined gaseous stream, at elevated temperatures, to a reactor operated under pressure and containing the cobalt molybdate catalyst, preferably supported and in the form of a fixed bed. The reaction mixture or effluent can be continuously withdrawn from the reactor and the p-dithiane product recovered therefrom. For example, the effluent can be flashed to remove volatile or vaporous products and unreacted reactant gases, and the liquid products, comprising p-dithiane, by-products such as diethyl sulfide, and unreacted carbon disulfide, collected. The p-dithiane product can be recovered from the liquid reaction products by any suitable means, such as distillation, crystallization, etc., or a combination of such. p-Dithiane itself is a crystalline compound.

Although the temperatures and pressures of the reaction system used in carrying out this invention can vary over a wide range, temperatures in the range of 350 to 750° F., preferably 400 to 550° F., and pressures in the range of 200 to 1000 p.s.i.g., preferably 600 to 800 p.s.i.g., will generally be used.

The objects and advantages of this invention are further illustrated by the following example, but it should be understood that the various amounts, temperatures, pressures, and other conditions recited in this example are illustrative and should not be construed to unduly limit this invention

*Example*

A reactor in the form of a catalyst case made of ¾ in. stainless steel pipe measuring 3 ft. in length and having a volume of 300 ml. was filled with a cobalt molybdate catalyst supported on alumina. This catalyst was in the form of 5/32 in. extruded pellets having a surface area of 200 square meters pergram and a bulk density of 0.94 gram per cubic centimeter, and consisted of 3 wt. percent CoO, 7.5 wt. percent $MoO_3$, and 89.5 wt. percent $Al_2O_3$. The catalyst case was mounted in an electrically heated furnace and the catalyst was not activated prior to use. The upstream side of the catalyst case was provided with an orifice meter and flow controller for metering and controlling the flow of ethylene to the catalyst case. A mixture of $H_2S$ and $C_2S$ was fed to the catalyst case from a cylinder with the aid of a mini-pump. An electrical preheater was used to bring the three-component feed mixture to 400° F. at the case inlet. The downstream side of the catalyst case was equipped with a motor valve activated by a pressure controller to permit flashing of the effluent to atmospheric pressure. Provision was made to collect the liquid products in a graduated cylinder. The vapor products were vented through a wet-test meter into a hood.

Ethylene was fed to the catalyst case at a rate of 2.2 cu. ft. per hour (80° F. and 685 mm. Hg) or 2.28 gram moles per hour, and the hydrogen sulfide-carbon disulfide mixture was fed at an average feed rate of 0.66 lb. per hour or 2.74 gram moles per hour, the total hydrogen sulfide-carbondisulfide feed over a 10 hour reaction period being 7.05 lbs. Pressure of the system was 600 p.s.i.g. with a preheat average temperature of 420° F., an average furnace temperature of 375° F., and a hot spot range of 400–565° F. After a 10 hour reaction period, the gaseous reaction products amounted to 44.25 cu. ft. at 80° F. and 586 mm. Hg, and the collected liquid products amounted to 1150 ml. or 1370 grams. The liquid products were distilled and a fraction boiling in the range of 330–400° F. and measuring 150 ml. was recovered and identified as p-dithiane with a molecular weight found to be 119, a sulfur content of 50.8 wt. percent, a melting point in the range of 224–236° F. (sublimes), and a boiling point of 390°.

Various modifications and alterations of this invention will become apparent to those skilled in the art from the foregoing discussion and example, and it should be understood that this invention is not to be unduly limited thereto.

I claim:

1. A method of preparing para-dithiane which comprises bringing together and reacting ethylene, hydrogen sulfide, and carbon disulfide in the presence of a cobalt molybdate catalyst, and recovering para-dithiane from the resulting reaction mixture.
2. The method according to claim 1 wherein said catalyst is supported on a carrier.
3. The method according to claim 1 wherein the relative weight ratio of the cobalt component, measured as cobaltous oxide, to the molybdenum component, measured as molybdenum trioxide, is in the range of 1:1 to 1:20.
4. The method according to claim 1 wherein said catalyst is supported on a carrier comprising alumina.
5. The method according to claim 1 wherein said catalyst is supported on alumina and where the cobalt compound, measured as cobaltous oxide, is in the range between 1 to 20 wt. percent, and the molybdenum component, measured as molybdenum trioxide, is in the range between 2 to 25 wt. percent.

References Cited in the file of this patent

UNITED STATES PATENTS 2,900,392   Remus et al. _____ Aug. 18, 1959